(12) United States Patent
Haddock

(10) Patent No.: US 6,578,858 B1
(45) Date of Patent: Jun. 17, 2003

(54) FLOOR SURFACE TREATMENT APPARATUS WITH DOLLY

(75) Inventor: John W. Haddock, Springdale, AR (US)

(73) Assignee: Alto U.S. Inc., Springdale, AR (US)

( * ) Notice: Subject to any disclaimer, the term of this patent is extended or adjusted under 35 U.S.C. 154(b) by 0 days.

(21) Appl. No.: 09/956,068

(22) Filed: Sep. 19, 2001

(51) Int. Cl.⁷ .................................................. B62B 1/04
(52) U.S. Cl. ............... 280/47.131; 280/639; 280/47.18; 15/49.1; 15/246; 451/350
(58) Field of Search ............................... 280/47.131, 35, 280/43, 43.1, 639, 651, 47.18, 62, 47.21, 79.11, 33.991; 451/350, 353; 15/49.1, 98

(56) References Cited

U.S. PATENT DOCUMENTS

| | | |
|---|---|---|
| 2,142,697 A | 1/1939 | Myers |
| 2,327,229 A | 8/1943 | Vavrik et al. |
| 2,675,246 A | 4/1954 | Arones |
| 2,926,369 A | 3/1960 | Holt |
| 2,949,619 A | 8/1960 | Holt |
| 3,027,581 A | 4/1962 | Holt |
| 3,100,903 A | 8/1963 | Doyle, Sr. |
| 3,155,996 A | 11/1964 | Berthelot et al. |
| 4,398,737 A | 8/1983 | Harding |
| 4,742,652 A | 5/1988 | Cannan et al. |
| 4,756,042 A | 7/1988 | Genovese et al. |
| 4,845,798 A | 7/1989 | Genovese |
| 5,129,708 A | 7/1992 | Swan |
| 5,765,250 A | 6/1998 | Lee |

FOREIGN PATENT DOCUMENTS

| | | |
|---|---|---|
| GB | 864218 | 3/1961 |

*Primary Examiner*—Brian L. Johnson
*Assistant Examiner*—Kelly E Campbell
(74) *Attorney, Agent, or Firm*—Blackwell Sanders Peper Martin LLP

(57) ABSTRACT

A floor surface treatment apparatus includes a wheeled vehicle having wheels and floor surface treating unit, and a dolly pivotally connected to the vehicle for pivoting movement between a lowered, support position in which the vehicle is supported by the dolly with the floor surface treating unit raised off the floor and a non-support position in which the vehicle is unsupported by the dolly. The dolly has at least three wheels for conjoint pivoting movement therewith relative to the floor surface treatment apparatus. The at least three wheels are arranged relative to each other such that in the support position of the dolly the at least three wheels stably support the apparatus with the floor surface treating unit raised off the floor. In its non-support position the dolly may be stowed onboard the apparatus during operation thereof.

21 Claims, 6 Drawing Sheets

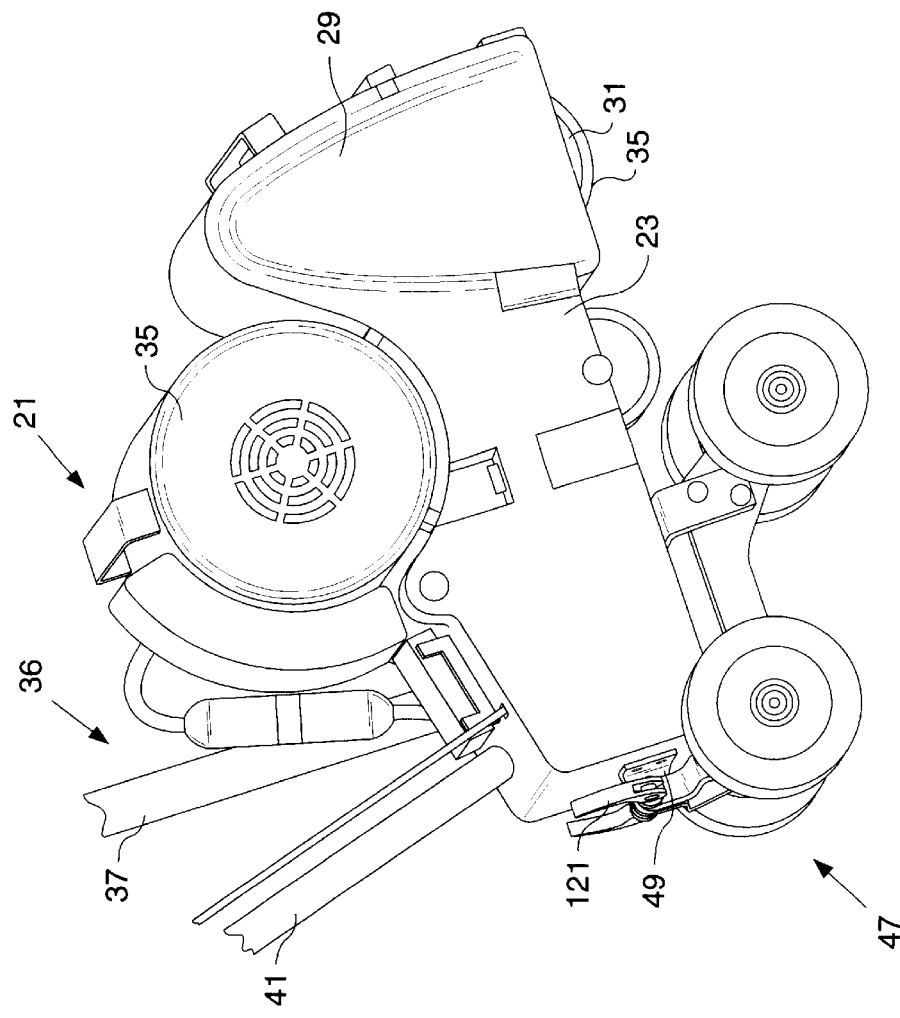

FLOOR SURFACE TREATMENT APPARATUS WITH DOLLY

BACKGROUND OF THE INVENTION

The present invention relates generally to floor surface treatment apparatus for treating a floor surface, and more particularly to a dolly for use in transporting and servicing such a floor surface treatment apparatus.

Floor surface treatment apparatuses such as floor polishers, floor scrubbers, liquid extraction machines, floor sanding machines and the like are used for treating various floor surfaces such as tile, wood, marble, carpeting and other common floor surfaces. Conventional floor surface treatment apparatus typically comprise a wheeled vehicle having a chassis, a drive motor, a floor surface treating unit driven by the drive motor in contiguity with the floor surface to treat the floor surface, and a handle for maneuvering the apparatus relative to the floor surface. The apparatus may include one or more wheels supporting the chassis for ease of movement of the apparatus relative to the floor surface, and these wheels may even be motor driven so that the apparatus is self-propelled over the floor surface.

When a conventional floor surface treatment apparatus is transported over long distances or over rough surfaces such as pavement, there is a risk that the wheels, wheel drive motor and/or the floor surface treating unit could be excessively worn or otherwise damaged. Thus, it is desirable to raise the wheels and the floor surface treating unit up off of the floor during transport. To this end, U.S. Pat. No. 4,398,737 discloses a transport device for wheelless power driven equipment in which the transport device is a detachable wheeled dolly having a pair of wheels that support the apparatus during transport. To transport the power driven equipment on such a transport device, the operator must grasp the handle of the equipment and tilt the equipment backward onto the dolly. Due to the heaviness of the equipment, transporting the equipment on such a two-wheeled transport device is relatively unstable, requiring the operator to exert force on the handle to counterbalance the weight of the equipment while also pushing or pulling the equipment in the desired direction of transport. Moreover, when servicing the equipment, a second operator or additional apparatus must exert the necessary force on the handle to maintain the equipment in the tilted back position to provide access to the underside of the equipment.

SUMMARY OF THE INVENTION

Among the several objects and features of the present invention may be noted the provision of a dolly for use in transporting a floor surface treatment apparatus over a floor surface; the provision of such a dolly which is carried onboard the apparatus when it is not deployed; the provision of such a dolly which stably supports the floor surface treatment apparatus during servicing and transport of the apparatus; the provision of such a dolly which supports the floor surface treatment apparatus in a tilted-back orientation during servicing and transport; and the provision of such a dolly which is easy to use.

In general, a dolly of the present invention for use in transporting a floor surface treatment apparatus over a floor surface comprises a carriage adapted for pivotal connection with the floor surface treatment apparatus to permit selective pivoting movement of the carriage relative to said apparatus about a pivot axis of the dolly between a support position in which the dolly supports the floor surface treatment apparatus with said apparatus raised off the floor surface and a non-support position in which the floor surface treatment apparatus is unsupported by the dolly. The carriage has at least three wheels mounted thereon for conjoint pivoting movement with the carriage about the pivot axis of the dolly. The at least three wheels are arranged relative to each other on the carriage such that in the support position of the dolly the at least three wheels engage the floor surface to stably support the floor surface treatment apparatus with the apparatus raised off of the floor surface.

In another aspect of the invention, a floor surface treatment apparatus generally comprises a wheeled vehicle having wheels supporting the vehicle and a floor surface treating unit in contiguity with the floor surface when the wheels of said vehicle are riding on the floor surface. A dolly is pivotally connected to the vehicle and is selectively positionable relative thereto about a pivot axis of the dolly between a support position in which the dolly supports the floor surface treatment apparatus with the floor surface treating unit raised off the floor surface and a non-support position in which the floor surface treatment apparatus is unsupported by the dolly. The dolly has at least three wheels mounted thereon for conjoint pivoting movement with the dolly about the pivot axis of the dolly. The at least three wheels are arranged relative to each other on the dolly such that in the support position of the dolly the at least three wheels engage the floor surface to stably support the floor surface treatment apparatus with the floor surface treating unit raised off of the floor surface.

In another embodiment, apparatus for treating the surface of a floor generally comprises a wheeled vehicle having wheels supporting the vehicle and a floor surface treating unit in contiguity with the floor surface when the wheels of said vehicle are riding on the floor surface. The apparatus further comprises a dolly for transporting the apparatus from place to place with the floor surface treating unit substantially raised off the floor surface over which the dolly is transported. The dolly is pivotally connected to the vehicle for movement between a raised, retracted position of stowage on the vehicle and a lowered position supporting the vehicle with the floor surface treating unit raised off the floor surface.

Other objects and features of the present invention will be in part apparent and in part pointed out hereinafter.

BRIEF DESCRIPTION OF THE DRAWINGS

FIG. 6 is a fragmentary side view similar to that of FIG. 5 with the dolly in its support position in which the floor surface treatment apparatus is supported by the dolly.

Corresponding reference characters indicate corresponding parts throughout the several views of the drawings.

DETAILED DESCRIPTION OF THE PREFERRED EMBODIMENT

Figure 1:
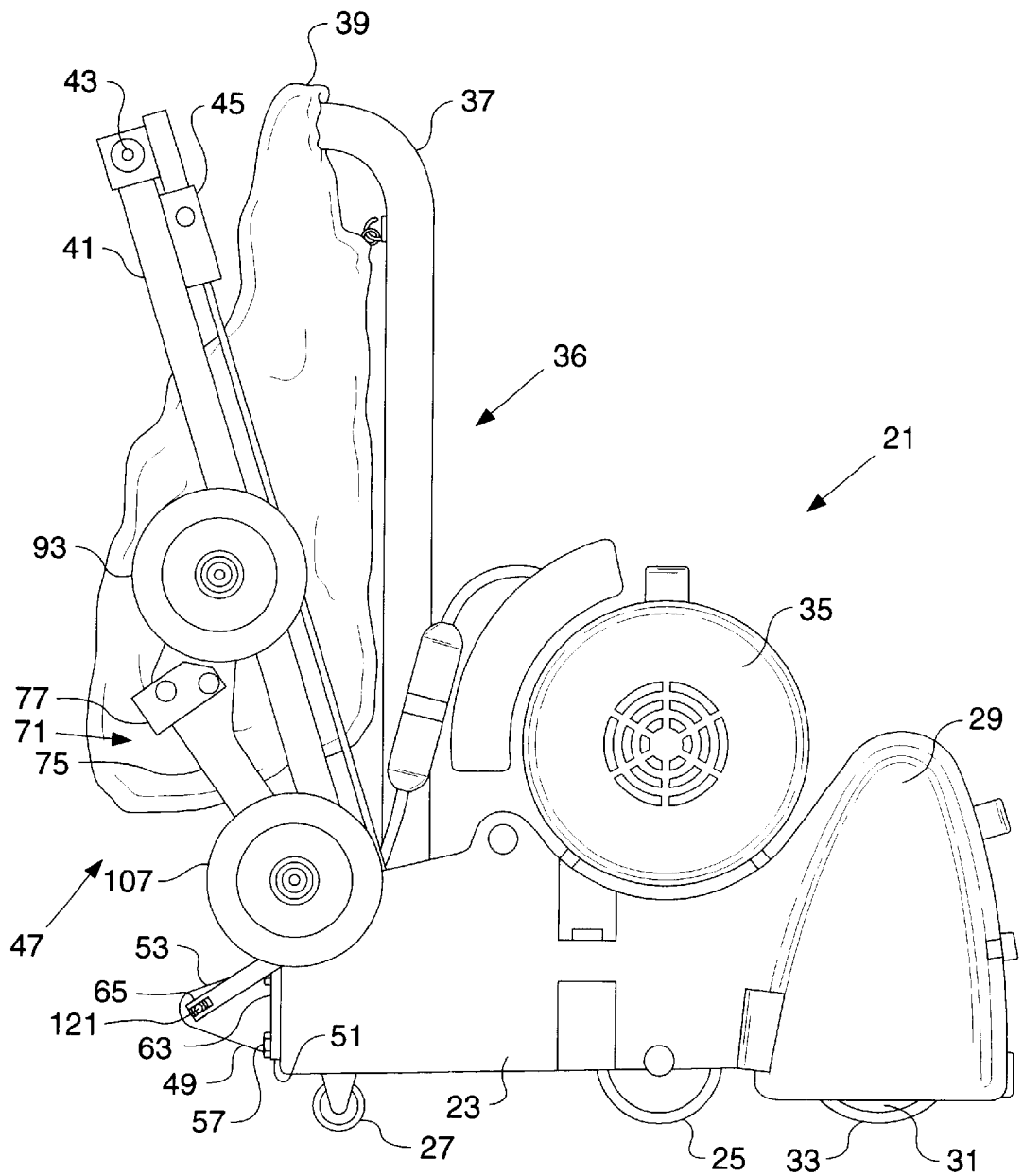
FIG. 1 is a side view of a floor surface treatment apparatus of the present invention with a dolly shown in a stowed, non-support position.

Referring now to the drawings and in particular to FIG. 1, a floor surface treatment apparatus of the present invention is illustrated and described herein as being a floor sanding apparatus, designated in its entirety by the reference numeral 21. It is understood that the floor surface treatment apparatus 21 may instead be a floor polisher, a floor scrubber, a liquid extraction machine or other conventional floor surface treatment apparatus without departing from the scope of this invention. The floor sanding apparatus 21 is a wheeled vehicle comprising a chassis 23 supported by a pair of wheels 25 (one of which is shown in FIG. 1) and a rear caster 27 for movement over a floor surface to be sanded. A housing 29 is carried by the chassis 23 generally forward of the truck wheels 25, and a drum 31, otherwise often referred to as a contact wheel, is rotatably mounted on the chassis 23 for rotation on a laterally (e.g., cross-wise) extending rotation axis (not shown) disposed generally within the housing. The drum 31 extends substantially the width of the housing 29 and is sized and positioned relative to the housing so that a portion of the drum extends down below the housing in contiguity with the floor surface. An endless abrasive belt 33 covers the portion of the drum 31 extending down below the housing 29 for abrading engagement with the floor surface. The belt 33 is frictionally retained on the drum 31 by a belt tensioning device (not shown) disposed in the housing 29 for continuous driven movement of the belt relative to the floor surface to sand the floor surface. The drum 31 and abrasive belt 33 together broadly define a floor surface treating unit in contiguity with the floor surface for treating the floor surface.

A motor 35 supported by the chassis 23 is drivingly connected to the drum 31 for rotating the drum. The motor 35 also drives a dust fan (not shown) of a vacuum system, generally indicated at 36, of the sanding apparatus for suctioning dust from the floor surface during operation of the apparatus. The vacuum system 36 includes a suction tube 37 supported by the chassis 23 rearward of the drum 31 and extending up from the chassis for delivering dust suctioned from the floor surface to a collection bag 39 connected to and supported by the suction tube at the upper end of the suction tube. A handle 41 is attached at its lower end to the rear of the chassis 23 and has laterally outward extending grips 43 (one of which is shown in FIG. 1) generally at its upper end for grasping by an operator to maneuver the floor sanding apparatus 21 over the floor surface being sanded. A control system 45 for controlling the various operating components of the sanding apparatus 21 such as the motor 35, the drum 31 and the vacuum system 26 is provided on the handle 41 intermediate the grips 43.

In operation of the floor sanding apparatus 21, the operator grasps the handle grips 43 and manipulates the control system 45 to operate the motor 35, which thereby drives rotation of the drum 31 and operates the dust fan of the vacuum system 36. The abrasive belt 33 is driven continuously to move relative to the floor surface in abrading engagement therewith to sand the floor surface. The operator moves the sanding apparatus 21 in a forward direction of travel (e.g., to the right in FIG. 1), using the handle 41 to maneuver the apparatus as desired. As the apparatus 21 moves over the floor surface in the forward direction of travel, the vacuum system 36 suctions dust from the floor surface for delivery via the suction tube 37 to the collection bag 39. Construction and operation of a floor sanding apparatus 21 such as that shown in the drawings and described above is generally known in the art and therefore will not be further described herein except to the extent necessary to set forth the present invention. However, it is understood that the floor sanding apparatus 21 may be of a type other than a drum-type floor sanding apparatus, such as a horizontal-type sanding apparatus (not shown) in which a rotating pad (not shown) is rotably driven about a generally vertical rotation axis and has an abrasive surface for engaging the floor surface to sand the floor surface upon rotation of the pad, without departing from the scope of this invention.

Figure 2:
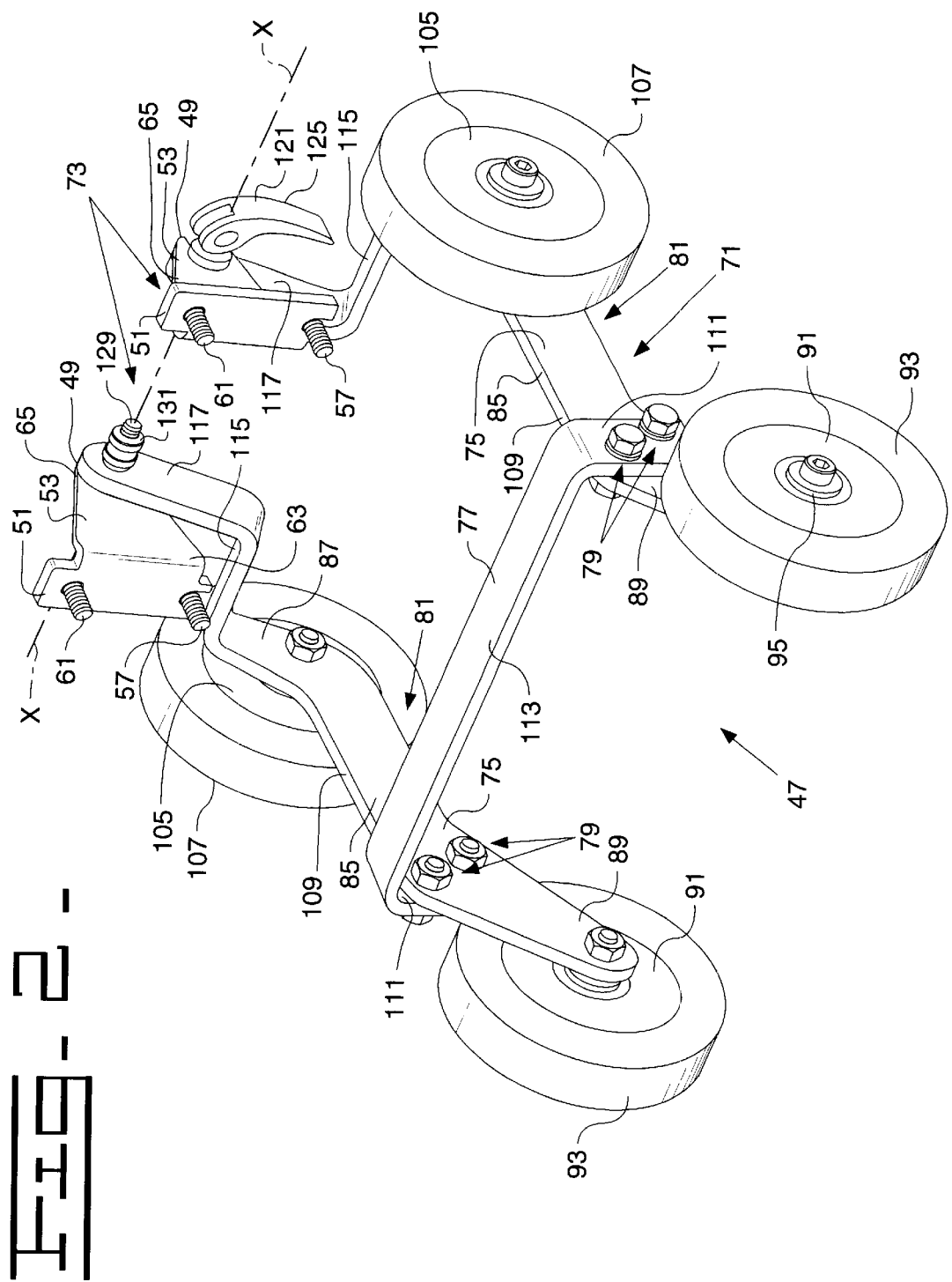
FIG. 2 is a perspective view of the dolly of FIG. 1 and mounting brackets for mounting the dolly on the floor surface treatment apparatus.

Now referring to FIGS. 1 and 2, a dolly 47 of the present invention for use in transporting and servicing the floor sanding apparatus 21 is generally indicated at 47. The dolly 47 is releasably and pivotally connected to the rear of the chassis 23 at a location generally below the handle 41 of the floor sanding apparatus 21 by mounting brackets 49 (one of which is shown in FIG. 1 mounted on the chassis 23) secured thereto. The mounting brackets 49 are mounted on the rear of the chassis 23 in generally parallel, laterally spaced relationship with other. Each mounting bracket 49 comprises a base plate 51 adapted for abutting against the chassis 23 and a mounting plate 53 extending transversely outward (e.g., rearward relative to the chassis) from the base plate. A lower edge of the base plate 51 has an arcuate notch 55 formed therein and sized for receiving the shank of a threaded fastener 57. The threaded fastener 57 is capable of threaded connection with the chassis 23 whereby the base plate 51 of the mounting bracket 49 seats down on the fastener 57 with the shank of the fastener received in the arcuate notch 55 of the base plate lower edge (as seen best in FIG. 2) and the head of the fastener securing the base plate against the chassis to thereby secure the mounting bracket on the chassis. An opening 59 in the base plate 51 spaced above the arcuate notch 55 receives a second fastener 61 therethrough for further securing the mounting bracket 49 on the chassis 23.

The mounting plate 53 of each mounting bracket 49 of the illustrated embodiment has a proximal end 63 formed integrally with the base plate 51 and a distal end 65 spaced from the base plate. As seen best in FIG. 1, the mounting plate 53 of the illustrated embodiment generally narrows in width from its proximal end 63 to its distal end 65 and has a generally circular recess 67 (FIG. 3), the purpose of which will become apparent, formed in the outer surface of the mounting plate generally at its distal end. A slot 69 (FIG. 3) for use in releasably connecting the dolly 47 to the mounting bracket 49 as will be described further herein is also formed in the distal end 65 of the mounting plate 53 and extends inward (e.g. forward relative to the chassis 23) generally along the diameter of the circular recess 67 to at least the center of the circular recess.

Figure 3:
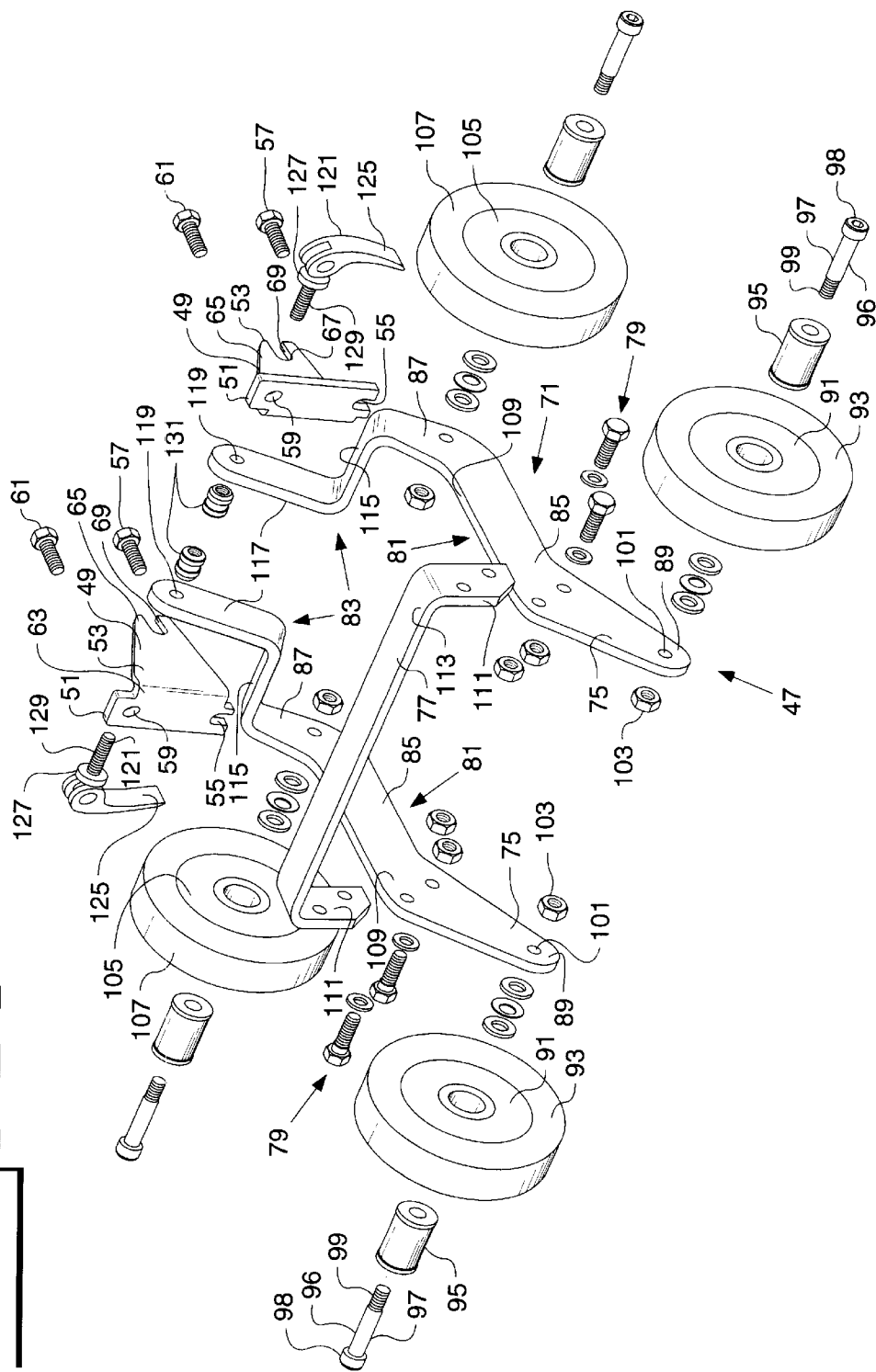
FIG. 3 is an exploded view of FIG. 2.

With particular reference to FIGS. 2 and 3, the dolly 47 comprises a carriage, generally indicated at 71, capable of supporting the floor sanding apparatus 21 above the floor surface in a lowered, support position of the dolly 47 and a connecting assembly, generally indicated at 73, for releasably and pivotally connecting the dolly to the mounting brackets 49. The carriage 71 comprises a pair of frame members 75 retained in laterally spaced relationship with each other by a cross-support 77 attached to the frame members by suitable fastener assemblies 79. Each frame member 75 is configured to include a carriage portion, generally indicated at 81, and a connecting portion, generally indicated at 83, formed with the carriage portion. The carriage portion 81 of each frame member 75 is generally Z-shaped in profile, having a central segment 85, a proximal end 87 extending rearward and up from the rear of the central segment and a distal end 89 extending forward and down from the front of the central segment.

A first wheel assembly 91 is mounted on the carriage 71 generally at the distal ends 89 of the carriage portion 81 of the frame members 75. The wheel assembly 91 of the illustrated embodiment comprises a pair of wheels 93, each individually mounted on a respective distal end 89 of the carriage portion 81 of one of the frame members 75, in coaxial, laterally spaced relationship with each other for rotation about a common rotation axis of the wheel assembly. Each wheel 93 is mounted on the frame member 75 by a wheel hub 95 and an axle pin 97 having a shaft 96 sized in diameter for receiving the wheel hub to rotatably mount the wheel on the pin. A head 98 of the axle pin 97 is sized larger in diameter than the shaft 96 to axially retain the wheel 93 and hub 95 on the shaft of the axle pin 97. The axle pin 97 also has a threaded inner end 99 sized for insertion through an opening 101 in the frame member 75 and for threadably receiving a nut 103 thereon to secure the wheel assembly 91 on the frame member.

A second wheel assembly 105 is similarly mounted on the carriage 71 generally at the juncture of the central segment 85 and the proximal end 87 of the carriage portion 81 of the frame member 75. This second wheel assembly 105 comprises a pair of wheels 107, each individually mounted on a respective one of the frame members 75, in coaxial, laterally spaced relationship with each other for rotation about a common rotation axis of the wheel assembly 105 separate from the rotation axis of the first wheel assembly 91 mounted on the distal ends 89 of the carriage portions 81 of the frame members. While the wheel assemblies 91, 105 of the illustrated embodiment comprise wheels 93, 107 that are each individually rotatably mounted on the frame members 75, it is contemplated that the wheels of each wheel assembly may instead be mounted on the frame members for conjoint rotation on the respective wheel assembly rotation axis by respective axles (not shown) extending laterally between the frame members without departing from the scope of this invention.

The cross-support 77 of the illustrated embodiment is sized in length to extend laterally over an upper edge 109 of each frame member 75 so that in the support position (FIG. 6) of the dolly 47 the floor sanding apparatus 21 rests on the cross-support to distribute the weight of the apparatus between the frame members. The cross-support 77 has down-turned ends 111 for attaching the cross-support to the outside of each frame member 75 generally at the front of the central segment 85 of each frame member 75. The cross-support 77 may alternatively be attached to the frame members 75 in other suitable manners, such as by sizing the length of the cross-support so that the down-turned ends 111 of the cross-support fasten to the inside of each frame member 75, or by welding the cross-support to each frame member, as long as a central span 113 (e.g., lateral extent) of the cross-support is disposed generally above the upper edges 109 of the frame members. It is also contemplated that the cross-support 77 may be positioned generally below the upper edges 109 of the frame members 75, so that in the support position of the dolly 47 the floor sanding apparatus 21 rests directly on the frame members, without departing from the scope of this invention. It is also contemplated that the cross-support 77 may be omitted, so that the frame members 75 of the carriage 71 are independently pivotally connected to the mounting brackets 49.

The connecting portion 83 of each frame member 75 is generally L-shaped, comprising a lateral extension 115 formed integrally with the proximal end 87 of the carriage portion 81 of the frame member and extending generally laterally inward therefrom, and a vertical extension 117 extending up from the inner end of the lateral extension. The vertical extensions 117 of the connecting portions 83 of the frame members 75 are laterally spaced from each other a distance slightly less than the spacing between the mounting plates 53 of the mounting brackets 49 so that the vertical extensions 117 of the connecting portions of the frame members are receivable between the mounting brackets with the vertical extensions being in abutting, or at least closely spaced, relationship with the mounting plates of the mounting brackets. Openings 119 (FIG. 3) in the vertical extensions 117 of the connecting portions 83 of the frame members 75 are located therein for axial registry with the slots 69 formed in the distal ends 65 of the mounting plates 53.

With particular reference to FIG. 3, the connecting assembly 73 of the illustrated embodiment comprises a pair of quick-release mechanisms 121 operable between a clamped configuration in which the quick-release mechanism secures the dolly 47 on the mounting brackets 49 of the floor sanding apparatus 21 and inhibits pivoting movement of the dolly relative to the apparatus, and a released configuration in which the dolly is capable of pivoting relative to the floor sanding apparatus about a pivot axis X (FIG. 2) of the connecting assembly and may also be disconnected from the apparatus. The quick-release mechanisms 121 each comprise a cam lever 125, a generally disk-shaped cam washer 127 sized for seating in the recess 67 formed in the outer surface of the corresponding mounting plate 53, and a pin 129 connected to the cam lever in a conventional over-center arrangement. The pin 129 is sized for insertion through the opening 119 in the respective vertical extension 117 of the connecting portion 83 of the carriage frame member 75 to pivotally mount the carriage 71 on the pin. The free (e.g., inner) end of the pin 129 is threaded and a retaining nut 131 is threadably received on the free end of the pin. The pin 129 is also sized for being received in the slot 69 formed in the distal end 65 of the mounting plate 53 of the mounting bracket 49 to pivotally mount the dolly 47 on the mounting brackets of the floor sanding apparatus 21.

The cam lever 125 is movable between a first position corresponding to the clamped configuration of the quick-release mechanism 121 and a second position (FIGS. 2 and 3) corresponding to the released configuration of the quick-release mechanism. The pin 129 extends generally centrally through the cam washer 127 for axial movement relative thereto whereby movement of the cam lever 125 between its first and second position effects axial movement of the pin and the retaining nut 131 relative to the mounting bracket 49, the carriage 71 and the cam washer. In the illustrated embodiment, movement of the cam lever 125 toward its first position corresponding to the clamped configuration effects laterally outward movement of the pin 129 and retaining nut 131. In the second position of the cam lever 125 corresponding to the released configuration of the quick-release mechanism 121, the axial spacing between the cam washer 127 and the retaining nut 131 is increased. The retaining nut 131 may then be loosened to further increase the axial spacing between the retaining nut and the cam washer 127 to a distance sufficient to permit sliding axial movement of the entire quick-release mechanism 121 relative to the mounting bracket 49 and the frame member 75 of the carriage so that the cam washer is positionable outward of the recess 67 formed in the mounting bracket.

To releasably connect the dolly 47 to the floor sanding apparatus 21, the quick-release mechanisms 121 are assembled with the carriage 71 by inserting the pins 129 through the respective openings 119 in the frame members 75 and threading the retaining nuts 131 onto the pins 129. The cam levers 125 are moved to their second position corresponding to the released configuration of the quick-release mechanisms. The carriage 71 is then positioned on the mounting brackets 49, with the vertical extensions 117 of the connecting ends of the frame members 75 positioned between the mounting brackets in closely spaced or abutting relationship therewith. As the carriage 71 is moved into position between the mounting brackets 49, the pins 129 of the quick-release mechanisms 121 are received in the slots 69 formed in the distal ends of the mounting brackets with each mounting bracket and corresponding frame members 75 positioned between the retaining nut 131 and the cam washer 127 of the respective quick-release mechanism. The cam lever 125 of each quick-release mechanism 121 is moved to its first position corresponding to the clamped configuration of the quick-release mechanism, thereby moving the pin 129 and retaining nut 131 of each mechanism axially outward relative to the cam washer 127, the mounting bracket 49 and the carriage 71.

The cam washers 127 thus seat in the recesses 67 formed in the mounting brackets 49 with the retaining nuts 131 abutting the frame members 75 so that each corresponding frame member and mounting bracket are tightly held between the cam washers and the retaining nuts to inhibit pivoting movement of the carriage 71 about the pivot axis 123 of the connecting assembly 73. Seating the cam washers 127 in the recesses 67 formed in the mounting brackets 49 also coaxially aligns the pins 129 of the quick-release mechanisms 121 whereby the pins define the pivot axis X of the connecting assembly 73 of the dolly 47 about which the dolly is capable of pivoting relative to the chassis 23 of the floor sanding apparatus 21. The retaining nuts 131 abutting the frame members 75 in the clamped configuration of the quick-release mechanisms 121 inhibit axial movement of the quick-release mechanisms so that the cam washers 127 are secured in the recesses 67 formed in the mounting brackets 49 to inhibit movement of the pins 129 of the quick-release mechanisms out of the slots 69 formed in the mounting brackets.

With reference to FIGS. 1 and 4–6, the carriage 71 of the dolly is pivotable about the pivot axis X defined by the pins 129 of the quick-release mechanisms 121 between the lowered, support position (FIG. 6) in which the entire floor sanding apparatus 21 is supported by the carriage in spaced relationship above the floor surface and a non-support position (FIG. 1) in which the floor sanding apparatus is substantially unsupported by the carriage. The non-support position of the illustrated embodiment of FIG. 1 is a generally stowed position in which the carriage 71 is raised, or retracted, and carried onboard the floor sanding apparatus 21 in a generally upright orientation with all four wheels 93, 107 of the dolly 47 up off of the floor surface so that the dolly does not interfere with normal operation of the apparatus. However, it is understood that the non-support position of the dolly 47 includes any position of the carriage 71 in which the floor sanding apparatus 21 is unsupported by the carriage, such as where the carriage is allowed to trail the sanding apparatus with two or more of wheels contacting the floor surface (as in FIG. 4), or where the dolly is disconnected entirely from the sanding apparatus, without departing from the scope of this invention.

As shown in FIG. 6, in the support position of the dolly 47 all four wheels 93, 107 of the dolly engage the floor surface and the floor sanding apparatus 21 seats on the cross-support 77 of the carriage 71 so that the weight of the apparatus is generally evenly distributed to the wheels via the frame members 75. The center of gravity (not shown) of the floor sanding apparatus 21 is positioned generally between the wheel assemblies 91, 105. Due to the generally Z-shaped configuration of the frame members 75 of the dolly carriage 71, the central segments 85 of the carriage portions 81 of the frame members 75 are angled generally up and forward relative to the floor surface so that the cross-support 77 is disposed at a height above the floor surface greater than the height of the rotation axis of the wheel assembly 105. As a result, the floor sanding apparatus 21 is supported by the dolly 47 in a tilted-back orientation with the front of the apparatus spaced above the floor surface a height greater than the rear of the apparatus. It is contemplated that the tilted-back orientation of the floor sanding apparatus 21 may be achieved other than with the dolly configuration of the illustrated embodiment, such as, for example, by using relatively straight frame members and using larger diameter wheels for the wheel assembly 91 than for the wheel assembly 105 so that the frame members are angled relative to the floor surface in the support position of the dolly 47.

Figure 4:
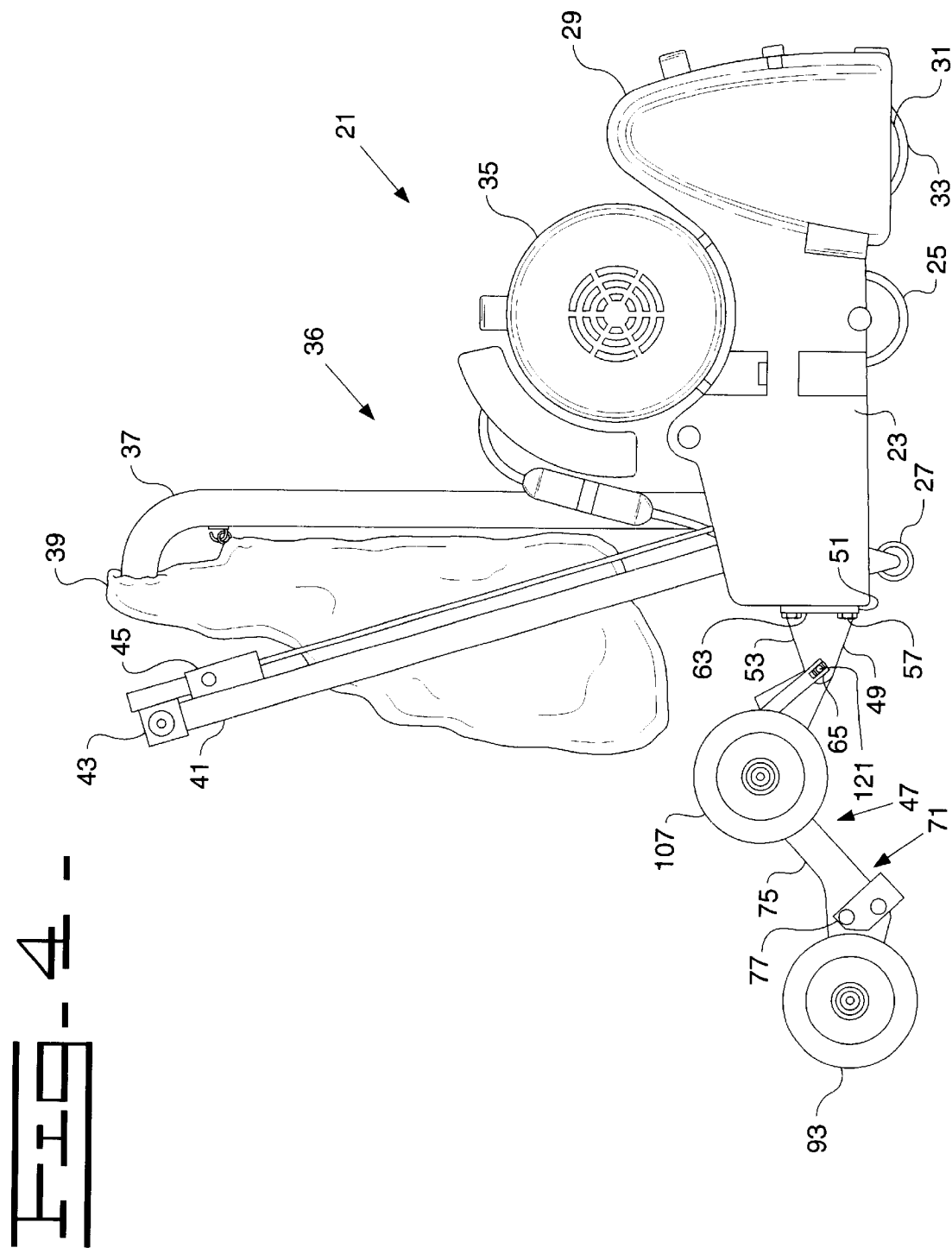
FIG. 4 is a side view of the floor surface treatment apparatus of FIG. 1 with the dolly moved partially toward a support position of the dolly.
Figure 5:
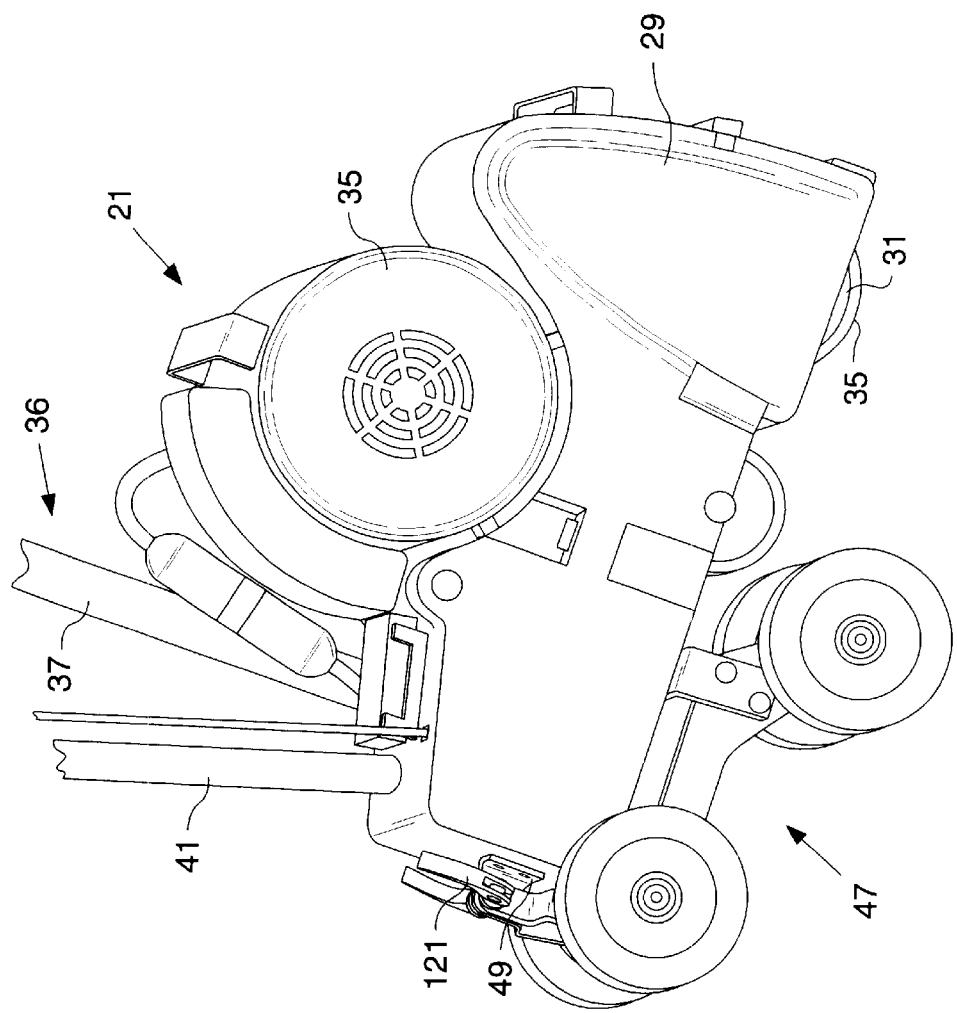
FIG. 5 is a fragmentary side view of the floor surface treatment apparatus with the dolly moved further toward its support position.

To move the dolly 47 from its stowed, non-support position (FIG. 1) to its support position (FIG. 6), the cam levers 125 of the quick-release mechanisms 121 are moved to their second positions corresponding to the released mode of the mechanisms to permit pivoting movement of the carriage 71 about the pivot axis X. The carriage 71 pivots freely down toward the floor surface until the wheels 93, 107 mounted on the distal ends 89 of the carriage portions 81 of the frame members 75 engage the floor surface as shown in FIG. 4. The operator then grasps the handle 41 and lifts the rear of the floor sanding apparatus 21 up off of the floor, thereby allowing the carriage 71 to pivot further about the pivot axis X to a position in which the wheels 93 mounted on the distal ends 89 of the frame members 75 of the carriage are positioned generally beneath the apparatus. The operator applies some force to the at least one of these wheels 93, such as with the operator's foot, and pushes the carriage 71 to pivot further forward relative to the sanding apparatus 21 until the wheels 93 are positioned substantially forward of the pivot axis X of the dolly 47 as shown in FIG. 5.

The operator then lowers the rear of the floor sanding apparatus 21, allowing the dolly wheels 107 mounted adjacent the proximal ends 87 of the carriage portions 81 of the carriage frame members 75 to engage the floor surface. The sanding apparatus 21 seats on the cross-support 77 of the carriage 71 and assumes a tilted-back orientation supported by all four wheels 93, 107 of the dolly 47 as shown in FIG. 6. As a result, the sanding belt 33 and drum 31 are raised further above the floor surface than the rear of the apparatus 21 and are therefore more accessible for servicing. The cam levers 125 of the quick-release mechanisms 121 are then moved to their first position corresponding to the clamping mode of the mechanisms. This procedure is generally reversed to move the dolly 47 to its non-support position. It is also contemplated that in the support position of the dolly 47, the floor sanding apparatus 21 may be tilted further back about the wheel assembly 105 until the handle 41 engages the floor surface so that the apparatus is supported by the handle and the wheel assembly with the sanding belt 33 and drum 31 raised further above the floor surface and facing generally forward for greater accessibility.

While the dolly 47 of the present invention is shown and described herein in connection with a floor sanding apparatus 21, it is understood that the dolly may be used in connection with a floor polisher, a floor scrubber, a liquid extraction apparatus or other floor surface treatment apparatus without departing from the scope of this invention.

In view of the above, it will be seen that the several objects of the invention are achieved and other advantageous results attained. By releasably connecting the dolly 47 to the floor surface treatment apparatus 21, the dolly can be carried by the apparatus in its non-support position without interfering with normal operation of the apparatus and is easily pivoted to its support position when transport or servicing of the apparatus is desired. More particularly, allowing the dolly 47 to remain connected to the floor surface treatment apparatus 21, such as in the stowed position of the dolly, reduces the risk of losing the dolly and provides convenient and ready access to the dolly when transport or servicing is desired. Also, by providing a dolly 47 that has a carriage 71 including at least three wheels 93, 107, the floor surface treatment apparatus 21 is stably supported by the dolly entirely above the floor surface without the help of an operator or other apparatus. This allows for transport of the apparatus 21 without the need for any wheels of the apparatus itself to support the apparatus during transport and without the need for the operator to support any of the weight of the apparatus. Configuring the carriage 71 to support the floor surface treatment apparatus 21 in a tilted-back orientation provides easier access to the underside of the apparatus, and in particular the floor surface treating unit of the apparatus, for servicing.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A dolly for use in transporting a floor surface treatment apparatus over a floor surface, said dolly comprising:
    a carriage adapted for pivotal connection with the floor surface treatment apparatus to permit selective pivoting movement of the carriage relative to said apparatus about a pivot axis of the dolly between a support position in which the dolly supports the floor surface treatment apparatus with said apparatus raised off the floor surface and a non-support position in which the floor surface treatment apparatus is unsupported by the dolly so that the dolly does not interfere with the normal operation of the floor surface treatment apparatus, the carriage having at least three wheels mounted thereon for conjoint pivoting movement with the carriage about the pivot axis of the dolly, said at least three wheels being arranged relative to each other on the carriage such that in the support position of the dolly the at least three wheels engage the floor surface to stably support the floor surface treatment apparatus with said apparatus raised off of the floor surface.

2. A dolly as set forth in claim 1 wherein the carriage comprises first and second frame members oriented in generally parallel spaced relationship with each other, and a cross-support extending between said first and second frame members and being connected thereto, in the support position of the dolly said floor surface treatment apparatus seating on at least one of said cross-support and said first and second frame members.

3. A dolly as set forth in claim 2 wherein the carriage is adapted for pivotal connection with the floor surface treatment apparatus generally at the rear of the apparatus, the frame members and cross-support being configured such that in the support position of the dolly the floor surface treatment apparatus is supported by the dolly in a generally tilted-back orientation.

4. A dolly as set forth in claim 1 wherein the carriage is configured such that in the support position of the dolly the floor surface treatment apparatus is supported by the dolly in an angular orientation relative to the floor surface.

5. A dolly as set forth in claim 4 wherein said carriage is configured such that in the support position of the dolly, the floor surface treatment apparatus is supported by the dolly in a generally tilted-back orientation.

6. A dolly as set forth in claim 1 wherein said at least three wheels comprises four wheels mounted on the carriage and arranged relative to each other to define a first pair of wheels mounted on the carriage in spaced, coaxial relationship with each other on a first rotation axis, and a second pair of wheels mounted on the carriage in spaced, coaxial relationship with each other on a second rotation axis separate from the first rotation axis, in the support position of the dolly the first and second pairs of wheels engaging the floor surface to stably support the floor surface treatment apparatus with said apparatus raised off the floor surface.

7. A dolly as set forth in claim 6 wherein said wheels are substantially identical in diameter, the first rotation axis of the first pair of wheels being generally vertically offset from the second rotation axis of the second pair of wheels relative to the carriage whereby in the support position of the dolly the carriage is generally angled relative to the floor surface such that the floor surface treatment apparatus is supported by the carriage in an angular orientation relative to the floor surface.

8. A dolly as set forth in claim 1 wherein in the non-support position of the dolly said at least three wheels are free from engagement with the floor surface during operation of the floor surface treatment apparatus.

9. A dolly as set forth in claim 8 wherein the carriage is further adapted for remaining pivotally connected to the floor surface treatment apparatus in a stowed position of the dolly whereby the dolly is carried onboard the floor surface treatment apparatus during operation of said apparatus.

10. A dolly as set forth in claim 8 wherein the carriage is adapted for releasable connection with the floor surface treatment apparatus, said dolly being disconnected from the floor surface treatment apparatus in the non-support position of the dolly.

11. A dolly as set forth in claim 1 further comprising a connecting assembly for pivotally and releasably connecting the carriage with the floor surface treatment apparatus to permit disconnection of the dolly from the floor surface treatment apparatus in the non-support position of the dolly.

12. A dolly as set forth in claim 11 wherein the connecting assembly is held in assembly with the carriage when the dolly is disconnected from the floor surface in the non-support position of the dolly.

13. A dolly as set forth in claim 11 wherein the connecting assembly comprises at least one pin for pivotally connecting the carriage with the floor surface treatment apparatus, said at least one pin defining the pivot axis of the dolly.

14. A dolly as set forth in claim 13 wherein the carriage comprises first and second frame members oriented in generally laterally spaced relationship with each other, each frame member having a connecting portion adapted for pivotal connection with the floor surface treatment apparatus, the connecting assembly comprising a pair of pins, each pin being capable of pivotally connecting a respective one of the first and second frame members with the floor surface treatment apparatus, the pins being in coaxial alignment with each other upon connecting the frame members with the floor surface treatment apparatus to thereby define the pivot axis of the dolly.

15. A dolly as set forth in claim 11 wherein the connecting assembly comprises at least one quick-release mechanism operable between a clamping mode in which the carriage is releasably secured to the floor surface treatment apparatus against disconnection therefrom and a release mode in which the carriage may be disconnected from the floor surface treatment apparatus.

16. A dolly as set forth in claim 15 wherein in the clamping mode of the quick-release mechanism the carriage is inhibited against pivoting movement about the pivot axis of the dolly.

17. A floor surface treatment apparatus comprising:
- a wheeled vehicle having wheels supporting the vehicle and a floor surface treating unit in contiguity with the floor surface when the wheels of said vehicle are riding on the floor surface; and
- a dolly pivotally connected to the vehicle and being selectively positionable relative thereto about a pivot axis of the dolly between a support position in which the dolly supports the floor surface treatment apparatus with said floor surface treating unit raised off the floor surface and a non-support position in which the floor surface treatment apparatus is unsupported by the dolly, the dolly having at least three wheels mounted thereon for conjoint pivoting movement with the dolly about the pivot axis of the dolly, said at least three wheels being arranged relative to each other on the dolly such that in the support position of the dolly the at least three wheels engage the floor surface to stably support the floor surface treatment apparatus with said floor surface treating unit raised off of the floor surface.

18. A floor surface treatment apparatus as set forth in claim 17 wherein said floor surface treatment apparatus is a floor sanding apparatus.

19. Apparatus for treating the surface of a floor, said apparatus comprising:
- a wheeled vehicle having wheels supporting the vehicle and a floor surface treating unit in contiguity with the floor surface when the wheels of said vehicle are riding on the floor surface; and
- a dolly for transporting said apparatus from place to place with the floor surface treating unit substantially raised off the floor surface over which the dolly is transported, the dolly being pivotally connected to the vehicle for movement between a raised, retracted position of stowage on the vehicle and a lowered position supporting the vehicle with the floor surface treating unit raised off the floor surface.

20. Apparatus as set forth in claim 19 wherein in the lowered position of the dolly the dolly further supports the vehicle with the wheels of the vehicle raised off the floor surface.

21. Apparatus as set forth in claim 19 wherein in the lowered position of the dolly said dolly supports the vehicle in a generally tilted-back orientation wherein the floor surface treating unit is accessible for servicing.

* * * * *